United States Patent
Liu et al.

(10) Patent No.: US 9,910,064 B2
(45) Date of Patent: *Mar. 6, 2018

(54) FORCE MEASUREMENT WITH REAL-TIME BASELINE DETERMINATION

(71) Applicant: Bruker Nano, Inc., Santa Barbara, CA (US)

(72) Inventors: Changchun Liu, Goleta, CA (US);
Bede Pittenger, Santa Barbara, CA (US); Shuiqing Hu, Santa Barbara, CA (US); Chanmin Su, Ventura, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,429

(22) Filed: Feb. 21, 2017

(65) Prior Publication Data
US 2017/0227577 A1   Aug. 10, 2017

Related U.S. Application Data

(62) Division of application No. 14/563,826, filed on Dec. 8, 2014, now Pat. No. 9,575,090.

(60) Provisional application No. 61/913,248, filed on Dec. 7, 2013.

(51) Int. Cl.
*G01Q 10/06*   (2010.01)

(52) U.S. Cl.
CPC .................................. *G01Q 10/065* (2013.01)

(58) Field of Classification Search
CPC ........ B82Y 35/00; G01Q 10/00; G01Q 10/02; G01Q 10/04; G01Q 10/045; G01Q 10/06; G01Q 20/00; G01Q 20/02; G01Q 30/00; G01Q 30/04; G01Q 30/06; G01Q 40/00; G01Q 40/02; G01Q 60/00; G01Q 60/24; G01Q 60/32; G01Q 60/36
See application file for complete search history.

(56) References Cited

U.S. PATENT DOCUMENTS

| | | | | |
|---|---|---|---|---|
| 9,575,090 B2* | 2/2017 | Liu | ........................ | G01Q 10/06 |
| 2010/0122385 A1* | 5/2010 | Hu | ........................ | B82Y 35/00 850/5 |
| 2012/0131702 A1* | 5/2012 | Shi | ........................ | G01Q 10/065 850/1 |
| 2012/0137394 A1* | 5/2012 | Butte | ................... | G01Q 30/025 850/1 |

* cited by examiner

*Primary Examiner* — David E Smith
(74) *Attorney, Agent, or Firm* — Boyle Fredrickson S.C.

(57) ABSTRACT

An atomic force microscope (AFM) and corresponding method to provide low force (sub-20 pN) AFM control and mechanical property measurement is provided. The preferred embodiments employ real-time false deflection correction/discrimination by adaptively modifying the drive ramp to accommodate to deflection artifacts.

11 Claims, 11 Drawing Sheets

FORCE MEASUREMENT WITH REAL-TIME BASELINE DETERMINATION

CROSS-REFERENCE TO RELATED APPLICATIONS

This application is a divisional of U.S. application Ser. No. 14/563,826, filed Dec. 8, 2014 (U.S. Pat. No. 9,575,090, issued Feb. 21, 2017), which claims priority under 35 USC §119(e) to U.S. Provisional Patent Application Ser. No. 61/913,248, filed on Dec. 7, 2013, each of which is entitled Force Measurement with Real-Time Baseline Determination. The subject matter of these applications are hereby incorporated by reference in their entirety.

BACKGROUND OF THE INVENTION

Field of the Invention

The preferred embodiments are directed to an apparatus and method of performing force measurements, and more particularly, an improved probe microscope for sensing tip-sample interaction forces that is able to provide real-time discrimination between tip-sample forces of interest and false force signals, i.e., deflection artifacts in typical force spectroscopy or force volume experiments.

Description of Related Art

Force Spectroscopy refers to a measurement where probe sample distance varies in a controlled way by approaching a probe to the sample and retracting from the sample. The interaction force or a related observable is monitored throughout the process. The force as the function of tip-sample distance during approaching and retracting is referred to as force spectroscopy or force curve. Force spectroscopy has long been a key method used by researchers to study a wide range of samples using a wide range of related techniques from pulling (where molecules are stretched and unfolding or binding forces are observed) to indentation (where a probe is pressed into a surface and elastic, plastic or creep properties of the sample are observed) to scratching (where the probe is pressed into the sample and then moved laterally to study wear and coating adhesion). For each of these sub-techniques dedicated instruments have been developed such as optical tweezers or magnetic beads for pulling, dedicated nanoindenters for indentation and automated scratch testers.

In this regard, developments in nanotechnology have enabled mechanical experiments on a broad range of samples including single molecules, such that fundamental molecular interactions can be studied directly. With a force sensitivity on the order of a few pico-Newtons ($pN=10^{-12}$ N), a particular type of scanning probe microscope (SPM) called an atomic force microscope (AFM) provides an excellent tool for probing fundamental force interactions between surfaces. AFM has been used to probe the nature of the forces between the probe and the sample for many types of interaction forces (van der Waals and electrostatic forces to name two) and has the advantage that there is no requirement that the tip or sample be conducting in order for the technique to work. Some examples of insulating and conducting samples that have been studied include materials such as silicon nitride, diamond, alumina, mica, glass, graphite, and various organic materials. Other applications include the study of adhesion, friction, and wear, including the formation or suppression of capillary condensation on hydrophilic silicon, amorphous carbon and lubricated $SiO_2$ surfaces.

For biological molecules, force is often an important functional and structural parameter. Biological processes such as DNA replication, protein synthesis, and drug interaction, to name a few, are largely governed by intermolecular forces. However, these forces are extremely small. With its sensitivity in the pico-Newton scale, the SPM has been employed to analyze these interactions. In this regard, SPMs typically are used to generate force curves that provide particularly useful information for analyzing very small samples (as small as individual molecules) or larger samples with a high level of detail.

The knowledge regarding the relation between structure, function and force is evolving and therefore single molecule force spectroscopy, particularly using SPM, has become a versatile analytical tool for structural and functional investigation of single bio-molecules in their native environments. For example, force spectroscopy by SPM has been used to measure the binding forces of different receptor-ligand systems, observe reversible unfolding of protein domains, and investigate polysaccharide elasticity at the level of inter-atomic bond flips. Moreover, molecular motors and their function, DNA mechanics and the operation of DNA-binding agents such as proteins in drugs have also been observed. Further, the SPM is capable of making nano-mechanical measurements (such as elasticity) on biological specimens, thus providing data relative to subjects such as cellular and protein dynamics.

Another main application of AFM force measurements is in materials science where the study of mechanical properties of nano-scale thin films and clusters is of interest. For example, as microstructures such as integrated circuits continue to shrink, predicting the mechanical behavior of thin films from known properties of the bulk materials becomes increasingly inaccurate. Therefore, continuing demand for faster computers and larger capacity memory and storage devices places increasing importance on understanding nano-scale mechanics of metals and other commonly used materials.

To understand the challenges associated with these experiments using AFM, it is instructive to review the AFM itself. AFMs are devices that typically use a sharp tip and low forces to characterize the surface of a sample down to atomic dimensions. In addition to surface characteristic imaging such as topographical imaging, the AFM can probe nano-mechanical and other fundamental properties of samples and their surfaces. Again, AFM applications extend into applications ranging from measuring colloidal forces to monitoring enzymatic activity in individual proteins to analyzing DNA mechanics.

In AFM, the probe tip is introduced to a surface of a sample to detect changes in the characteristics of the sample. Relative scanning movement between the tip and the sample is provided so that surface characteristic data can be acquired over a particular region of the sample, and a corresponding map of the sample surface can be generated. Notably, SPMs also include devices such as molecular force probes (MFPs) that similarly use a probe to characterize sample properties, but do not scan.

In one application of AFM, either the sample or the probe is translated up and down relatively perpendicularly to the surface of the sample in response to a signal related to the motion of the cantilever of the probe as it is scanned across the surface to maintain a particular imaging parameter (for example, to maintain a set-point oscillation amplitude). In this way, the feedback data associated with this vertical motion can be stored and then used to construct an image of the sample surface corresponding to the sample characteristic being measured, e.g., surface topography. Other types of images are generated directly from the detection of the cantilever motion or a modified version of that signal (i.e., deflection, amplitude, phase, friction, etc.), and are thus are often able to provide complementary information to topographical images.

A key element of the AFM is the probe. The probe consists of a microscopic cantilever of typical length 10-1000 microns and spring constant of 0.001-1000 N/m. The cantilever is fixed at its base and usually interacts with the sample through a tip located near its free end. To localize the measurement, the AFM probe often has a very sharp tip apex (less than a few nanometers in diameter). These sharp tips allow high resolution mapping of topography (often to choose a region of interest for force spectroscopy) and material properties by scanning laterally across the surface, but are more fragile than larger tips. The range of force that can be applied or observed typically depends on the stiffness (spring constant) of the cantilever to which the tip is attached. To access different ranges of force, the user needs only to change the probe.

A second key element of the AFM is the micropositioner or scanner, which allows the relative position between the base of the cantilever and the sample to be controlled. The relative position of tip and sample can be controlled by either moving the probe, the sample, or some combination of the two. Most AFM scanners allow control of the relative tip-sample position in three dimensions (note that Z-axis scanner may be separate or integral with the AFM scanner providing raster scanning), both approximately perpendicular to the sample surface and approximately parallel to it.

In a typical force spectroscopy ramping operation, the tip is moved relative to the sample surface (usually toward the surface), until a certain force or deflection trigger threshold is met, at which point the system automatically takes an action such as changing the direction or speed of motion. Alternatively, some other measured variable (amplitude, phase, deflection, current, deformation, lateral force, etc.) can be used instead of force and "Z" and/or another system controllable parameter may be adjusted (ramp at a different rate, move laterally to scratch, apply an electrical bias to tip or sample, change the drive amplitude or frequency, etc.) Notably, the wide range of force (a few pN to a few µN) that can be applied with AFM allows it to be adopted for all of these techniques. Moreover, AFM based force spectroscopy can be carried out on conductive or non-conductive samples in air, liquid, vacuum, and over a wide range of temperature. These characteristics have allowed it to be adopted for studies from the nature of intermolecular forces such as van der Waals and molecular folding to adhesion, friction, wear, plastic creep, viscoelasticity, and elasticity.

As an overview, a simple force curve records the force on the tip of the probe as the tip approaches and retracts from a point on the sample surface. The value of force is indicated by deflection of the probe cantilever. With known spring constant, the cantilever defection can be directly converted to interaction force by Hook's law. A more complex measurement known as a "force volume," is defined by an array of force curves obtained as described above over an entire sample area. Each force curve is measured at a unique X-Y position on the sample surface, and the curves associated with the array of X-Y points are combined into a 3-dimensional array, or volume, of force data. The force value at a point in the volume is the deflection of the probe at that position (x, y, z).

Figure 1A:
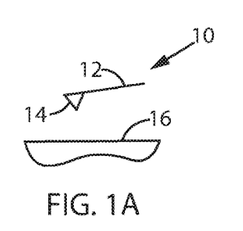
FIGS. 1A-1E illustrate a probe of an SPM as probe-sample separation is modulated to approach and retract the two relative to one another so that the tip-sample forces can be mapped.
Figure 1B:
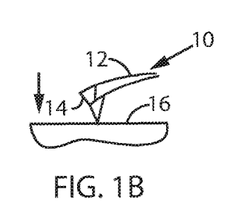
Figure 1C:
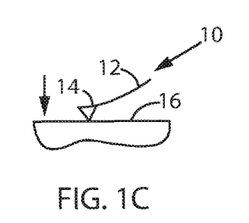
Figure 1D:
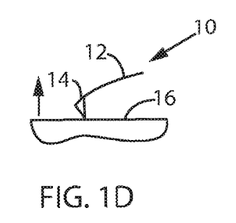
Figure 1E:
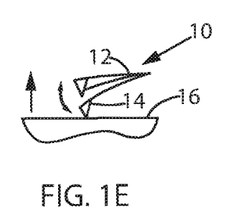
Figure 2:
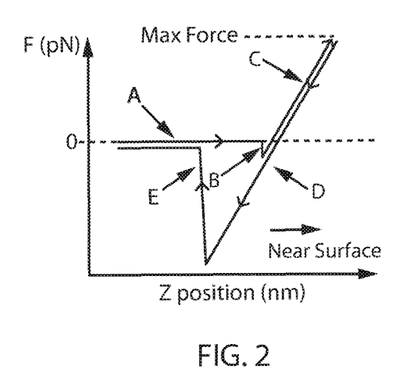
FIG. 2 is a schematic plot illustrating force data obtained by the operation shown in FIGS. 1A-1E.

Turning to FIGS. 1A-1E and 2, a typical force curve resulting from force spectroscopy using SPM (AFM) is illustrated. More particularly, FIGS. 1A-1E show how the forces between a tip 14 of a probe 10 and a sample 16, at a selected point (X,Y) on the sample, deflect a cantilever 12 of probe 10 as the tip-sample separation is modulated in a direction generally orthogonal to the sample surface. FIG. 2 shows the magnitude of the forces as a function of sample position, i.e., a force curve or profile.

In FIG. 1A, probe 10 and sample 16 are not touching as the separation between the two is narrowed by moving the sample generally orthogonally toward the sample surface. Zero force is measured at this point of the tip-sample approach, reflected by the flat portion "A" of the curve in FIG. 2. Next, probe 10 may experience a long range attractive (or repulsive force) and it will deflect downwardly (or upwardly) before making contact with the surface. This effect is shown in FIG. 1B. More particularly, as the tip-sample separation is narrowed, tip 14 may "jump" into contact with the sample 16 if it encounters sufficient attractive force from the sample. In that case, the corresponding bending of cantilever 12 appears on the force profile, as shown in FIG. 2 at the curve portion marked "B."

Turning next to FIG. 1C, once tip 14 is in contact with sample 16, the cantilever will return to its zero (undeflected) position and move upwardly as the sample is translated further towards probe 10. If cantilever 12 of probe 10 is sufficiently stiff, the probe tip 14 may indent into the surface of the sample. Notably, in this case, the slope or shape of the "contact portion" of the force curve can provide information about the elasticity of the sample surface. Portion "C" of the curve of FIG. 2 illustrates this contact portion.

In FIG. 1D, after loading cantilever 12 of probe 10 to a desired force value, the displacement of the sample 16 is reversed. As probe 10 is withdrawn from sample 16, tip 14 may either directly adhere to the surface 16 or a linkage may be made between tip 14 and sample 16, such as via a molecule where opposite ends are attached to the tip 14 and surface 16. This adhesion or linkage results in cantilever 14 deflecting downwards in response to the force. The force curve in FIG. 2 illustrates this downward bending of cantilever 14 at portion "D." Finally, at the portion marked "E" in FIG. 2, the adhesion or linkage is broken and probe 10 releases from sample 16, as shown in FIG. 1E. Particularly useful information is contained in this portion of the force curve measurement, which contains a measure of the force required to break the bond or stretch the linked molecule.

The maximum force in FIG. 2 is the most important feature in the measurement operation. Once a pre-defined maximum force is reached, also called trigger force or trigger threshold or simply trigger, the piezo actuator will pull the tip away from the sample and perform the retract measurement, as shown in curve D of FIG. 2. Practically, curve C (approaching) and D (retracting) in FIG. 2 should overlap. Separation is only shown for ease of viewing. The level of the trigger force determines the level of the measurement system performance. State of art instrumentation can operate and a trigger force of a few hundred pN to 1 nN reliably. Lower trigger force is desired in force spectroscopy measurements. Practically, AFM measures deflection and converts deflection to force. The trigger force is represented by a predefined deflection value. When the probe is not interacting with the sample, the deflection remains constant. Variation of deflection relative to the constant is generally caused by tip sample interaction and is used as a measure of the tip-sample interaction force.

Although SPMs are particularly useful in making the above-described measurements, there have been problems with such systems. Experimentally, in the example shown in FIGS. 1A-E and 2, a force curve measurement is made by applying, for example, a cyclical triangle wave voltage pattern to the electrodes of the Z-axis scanner. Such conventional systems often lack flexibility in making measurements that are non-cyclic. The triangle wave drive signal causes the scanner to expand and then contract in the vertical direction, generating relative motion between the probe and the sample. In such a system, the amplitude of the triangle wave as well as the frequency of the wave can be controlled so that the researcher can linearly vary the distance and speed that the AFM cantilever tip travels during the force measurement.

Oftentimes it is desired to modify the parameters of the force measurement in a non-cyclical manner, including the speed at which the tip-sample separation is modulated, the duration of a pause (to allow molecular binding between tip and molecules on the surface, for example), etc. to analyze forces corresponding to, for example, complex mechanical models of certain samples. In U.S. Pat. Nos. 6,677,697 and 7,044,007 assigned to Bruker Nano, Inc., each of which is expressly incorporated by reference herein, a system and method are disclosed in which the flexibility in performing the force measurement is improved. For example, a specific change or rate of change in tip-sample force or a specific value of a tip-sample force may indicate some property pertaining to the sample in question. In response, the instrument alters a force curve measurement parameter (such as the speed of the movement) in response to a specific measurement condition. Or, for example, rather than following a path of position (separation) versus time, the system is able to follow a path of force versus time where the position (separation) is controlled to produce the desired force profile.

Figure 3:
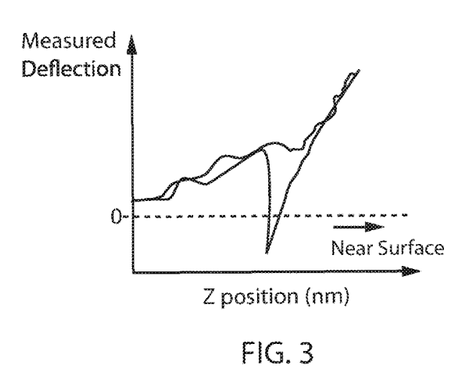
FIG. 3 is a schematic plot illustrating probe deflection generally corresponding to the force curve shown in FIG. 2, showing a deflection artifact.

Nonetheless, drawbacks still persisted. One in particular has been the ability to factor in the background (or baseline force) while making such measurements. FIG. 3 schematically illustrates deflection associated with, for example, the force curve of FIG. 2, including the effect of a deflection artifact, due to factors described herein that are not related to actual interaction between the probe tip and sample. As shown, the baseline of the force curve, as the probe and sample are brought in to contact from a position in which there is no tip-sample interaction, has a non-ideal slope "S". As described previously, this could be caused by many factors including system drift, etc. When attempting to trigger operation of the force measurement based on particular tip-sample force(s) this deflection artifact can make it appear that the threshold trigger force has been achieved when in fact it has not, clearly a problem when attempting to measure pico-scale forces.

Stepping back, previously the force trigger was either an absolute threshold, or a relative threshold based on the background deflection when the tip is at its ramp start position. Ideally, the absolute trigger would be sufficient to address most experiment types; however, it has been realized that using a "relative threshold" would simplify operation when the system is not perfectly aligned or if there was some long term drift of the cantilever deflection. Relative triggering is preferred in most cases where the ramp begins with the tip far enough from the sample that it is unaffected by forces due to interaction with the sample. Unfortunately, this does nothing to address the situation where the measured cantilever deflection changes (during the ramp) do not arise from a force between the sample and the tip, but instead result from a measurement "artifact". Stated another way, absolute triggering works best when there is no measurement artifact (the measurement baseline=0), and relative triggering works best when there is a constant offset to the artifact (baseline=constant). If the baseline is not constant during the ramp, it is clear that the real deflection and force can be either smaller or larger than the trigger threshold. Since the "false deflection" (deflection before the tip interacts with the surface) can affect the trigger, the precision, repeatability, and fine control of the deflection trigger, the baseline variation has been a major concern for both AFM makers and users.

Figure 4A:
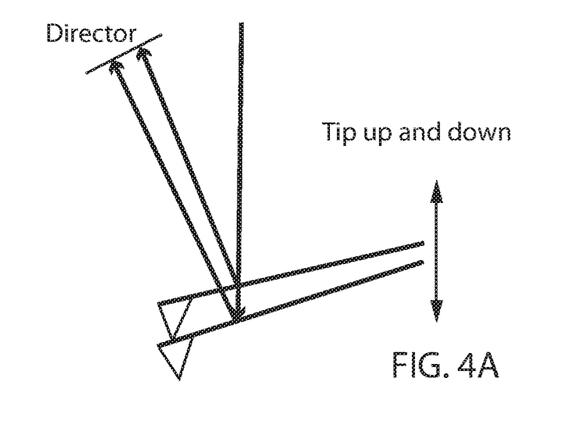
FIG. 4A is a schematic illustration of a source of deflection artifact due to movement of the probe relative to the optical detection scheme.
Figure 4B:
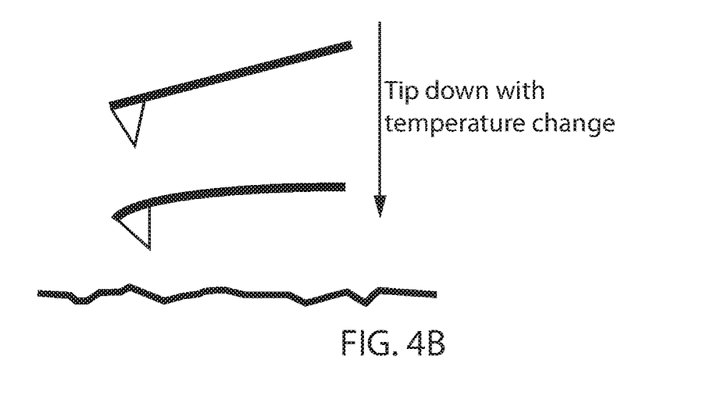
FIG. 4B is a schematic illustration of a source of deflection artifact due to thermal effects causing probe deflection.
Figure 4C:
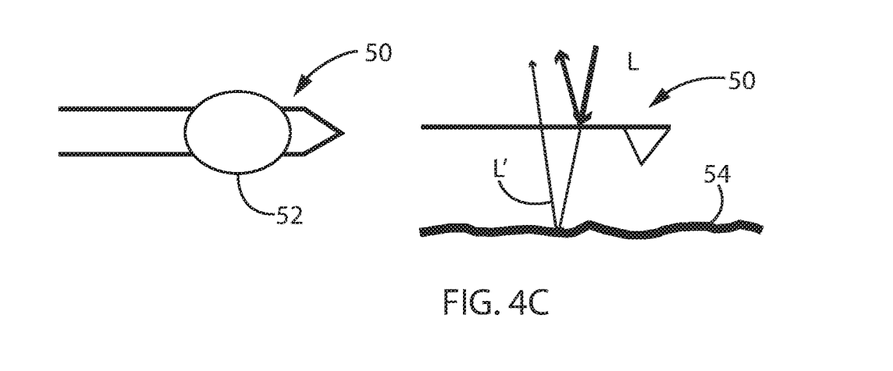
FIG. 4C is a schematic illustration of a source of deflection artifact due to light scattered from the sample.
Figure 5A:
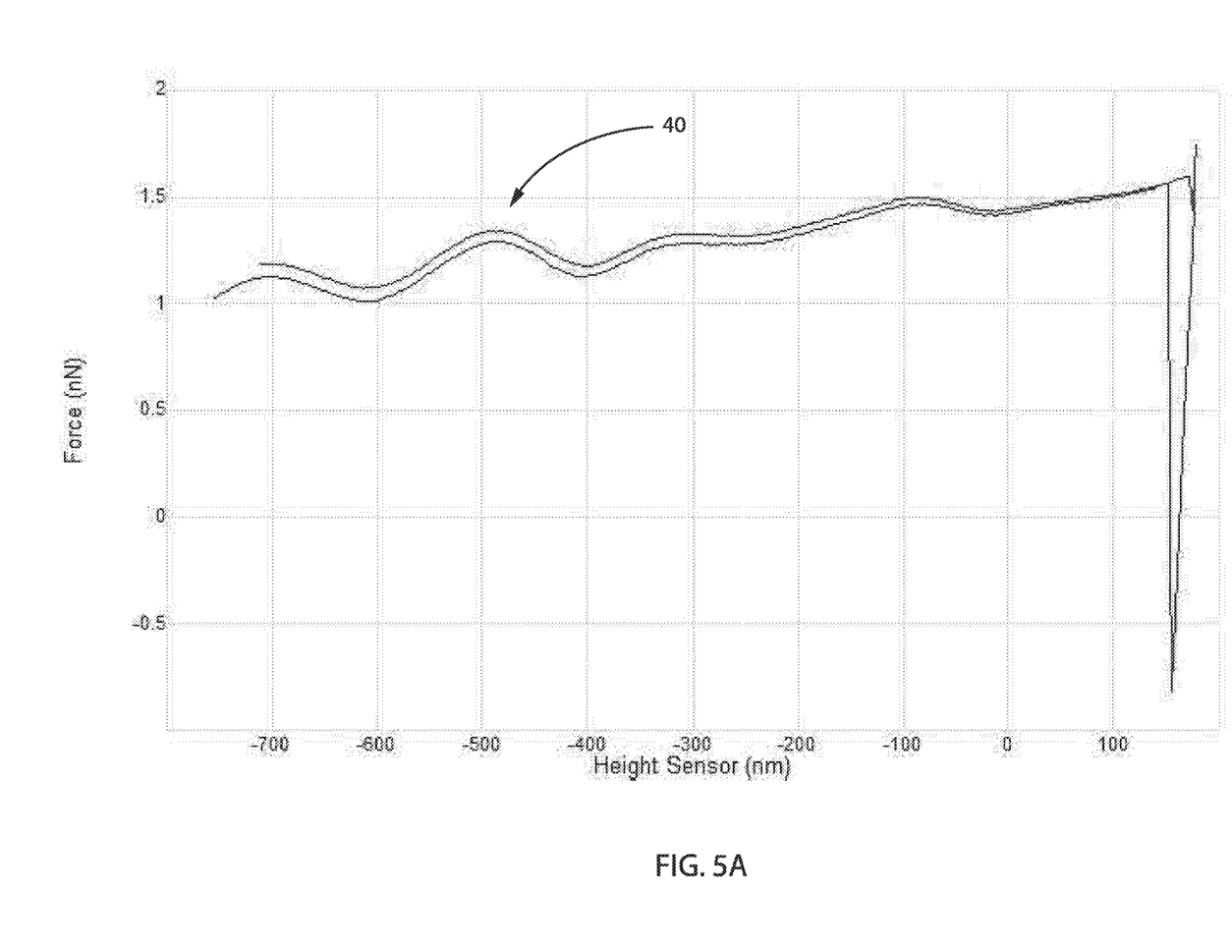
FIGS. 5A and 5B are schematic plots illustrating deflection artifacts due to imperfect and optical interference, respectively.
Figure 5B:
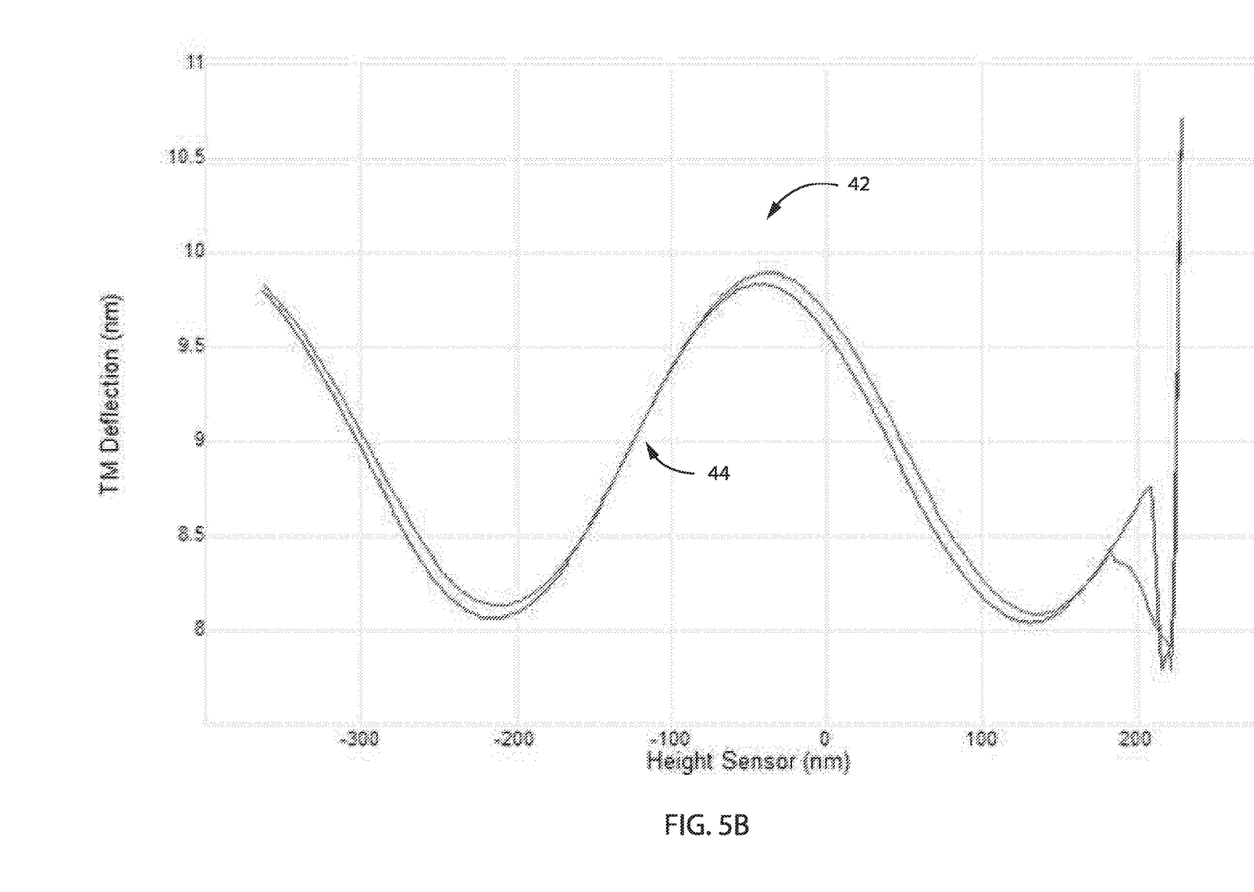

To improve the precision and repeatability of the real-time trigger in force spectroscopy, AFM manufacturers have attempted to design systems to reduce the false deflection. However, eliminating the false deflection due to imperfections in the optical path and cantilever base motion (see FIG. 4A), cantilever bending that is unrelated to the force on the tip, e.g., thermal effects causing the tip to bend downwardly with temperature change (see FIG. 4B), and presence of light scattered from the sample (FIG. 4C—the top view of a probe 50 on the left shows a laser light spot 52 from a beam L filling the width of the lever, with some light L' spilling laterally over the sides of the lever and on to the sample 54), or interference due to non-plenary cantilever surface, has remained a challenge. Data illustrating two such deflection artifacts are shown in FIG. 5A (deflection artifact due to optical interference and imperfect optical path causing a positive slope and modulation 40 in the force curve) and 5B (deflection artifact due to strong optical interference 44 in force curve 42, showing both large positive and negative slope in the measured deflection). Notably, as developers turn to shorter cantilevers for higher bandwidth low noise measurements, some of these effects are exacerbated.

Previous attempts to address this issue by processing the data have primarily been confined to offline analysis, where algorithms have been applied to correct the force spectra after acquisition. The algorithms typically calculate the baseline slope (from the part of the curve where the tip is not yet interacting with the surface, e.g., approach) and subtract it from the dataset. Once the artifact in the data is corrected by removing slope in the deflection measurement when the tip is not in proximity to the sample (distance larger than 10 nm), the real maximum force or trigger force can be recovered. The corrected data, as a whole, for both approaching and retracting are then used to derive the sample properties in further analysis. This partially addresses the problem, but ignores the fact that the tip and sample can be altered by the history of force that they experience. There are at least three distinctive cases in which the measurement may be adversely impacted. In one case, the slope or variation of deflection artifact can reach the predefined trigger force (or trigger threshold for deflection). In that case, the piezo actuator of the AFM system will retract the probe based on this false trigger.

Figure 18:
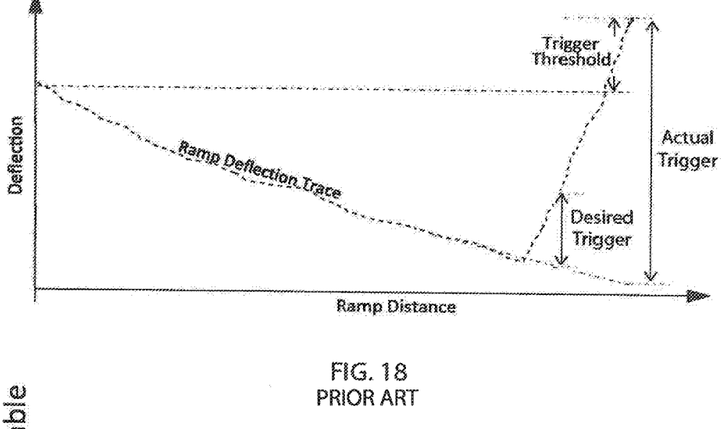
FIG. 18 is a schematic plot illustrating traditional triggering with negative baseline slope, marked "Prior Art"

As a result, the force spectroscopy data thereby acquired would not reflect any tip sample interaction. This is commonly known as a false triggered force curve. In another case, and particularly when the slope is tilting downwardly as the probe approaches the sample (further illustrated in FIG. 18), the maximum trigger force can be substantially higher than the desired trigger force. The sample or the probe can be irreversibly damaged. In the third case, multiple force curves may need to be measured at an identical trigger force. In this case, artifact deflection can modify the individual trigger due to time or positional variation of the artifact between each set of multiple force curves. The big challenge has been how to discriminate the artifact from the important data before the whole ramp is collected. In that case, the system could automatically take action based on the artifact free data to change the ramp direction, or velocity, apply a bias to tip or sample, or adjust another system controllable parameter.

An example of real-time false deflection correction for AFM is suggested in U.S. Pat. No. 8,650,660, assigned to Bruker Nano, Inc. (the entirety of which is expressly incorporated by reference herein), which discloses the use of the so-called Peak Force Tapping mode to perform mechanical property measurements. In this case, the assumption is made that the false deflection is "nearly constant" and the system lifts the probe to measure the false deflection artifact with no interaction and then subtracts the measured artifact from all subsequent curves. Unfortunately, the false deflection can vary over time and as a function of position. In particular, the false deflection can be very sensitive to distance between the tip and sample, making it impractical to use this technique without first finding the surface by touching it with the tip. This rules out this method for experiments where the first contact of the tip and sample must be observed, or when the tip is particularly fragile and the tip-sample force must never exceed a value that is less than the deflection background. Additionally, the assumption that the false deflection is constant often fails when the force measurements are separated laterally by more than a few tens of nanometers.

Real-time discrimination was desired because it (1) allows the tip or functionalized groups on the tip to be preserved, (2) allows data to be collected while the sample is in a specific configuration that could be disrupted by any further change in force (through irreversible deformation or detachment of a molecule from the tip), and (3) allows the system to perform other actions (scratch, hold, change direction of motion) once a specific force is reached.

SUMMARY OF THE INVENTION

The preferred embodiments overcome the drawbacks of prior systems by providing a method of operating an AFM to perform force spectroscopy that is able to discriminate deflection artifacts from deflection due to actual tip-sample interaction. The system is able to do this in real time without making any assumptions regarding the background responsible for deflection artifacts, i.e., no prior knowledge of the system set-up, operation or environment is required.

According to a first aspect of the preferred embodiment, a method of detecting an observable interaction between a sample and a probe of an AFM includes positioning at least one of the probe and the sample at a location of interest of the sample. The method then moves at least one of the probe and the sample to lessen a separation therebetween and cause the two to interact. Then, an observable interaction based on the moving step is determined. The method is able to discriminate between an observable interaction artifact and an observable interaction due to actual probe-sample interaction from the measured observable interaction data to derive an artifact free observable interaction and compare it with a trigger. Finally, the method in this case retracts the probe from the sample if the artifact free observable interaction substantially corresponds to the trigger.

According to another aspect of this preferred embodiment, the observable interaction includes at least one of a group including: force, deflection, electric interaction (e.g., force, current, voltage), magnetic interaction, thermal interaction and electromagnetic interaction (e.g., scattering near field optical signals).

In another aspect of the preferred embodiments, a method of detecting a force between a sample and a probe of an AFM includes positioning at least one of the probe and the sample at a location of interest of the sample, and moving at least one of the probe and the sample to lessen a separation therebetween and cause the two to interact. The method then measures a deflection of the probe based on the moving step, and discriminates a deflection artifact from a deflection due to probe-sample interaction from the measured deflection data to derive an artifact free deflection and compare it with a predefined trigger force. If the artifact free deflection substantially corresponds to the trigger force the probe is retracted from the sample, and the force between the sample and the probe is determined. Forces less than 20 pN can be detected and used as a trigger point using the present techniques.

According to a further aspect of this embodiment, the discriminating step includes comparing a drive ramp to a fit line based on data corresponding to the deflection, and further includes extrapolating the baseline based on the comparison.

In another aspect of this embodiment, the comparing and extrapolating steps are repeated so as to provide a rolling baseline until a threshold trigger is met.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

The preferred embodiments employ a real-time determination of a changing baseline deflection in order to preserve the integrity of the force experiment being performed, and achieve resolution of sub-20 pN tip-sample interaction forces. As data is obtained, the ramp used to drive the probe-sample separation is modified using a mathematical fit and extrapolating the ramp to accommodate artifact deflection, i.e., deflection other than that due to actual probe-sample interaction.

Figure 6:
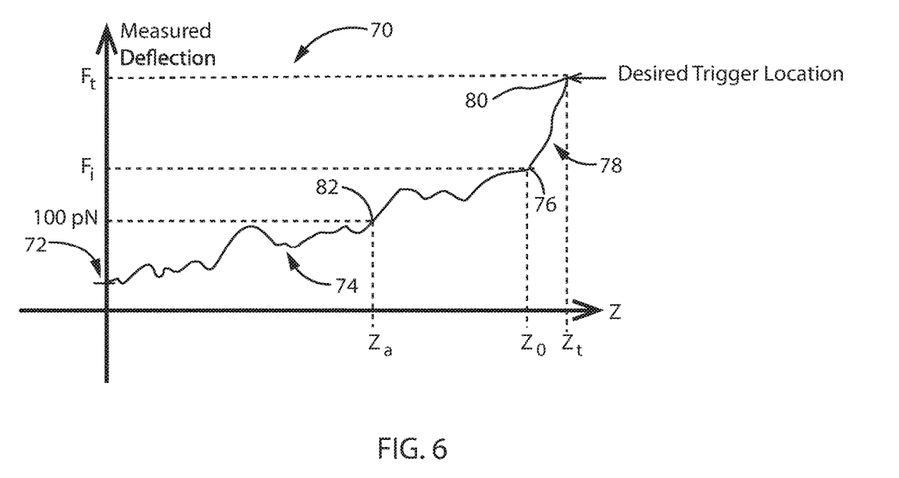
FIG. 6 is a schematic deflection versus probe-sample separation plot illustrating a false trigger.

An illustration of the preferred embodiments begins with a discussion of the deflection artifact problem being addressed and is shown in FIG. 6. FIG. 6 shows a plot 70 of measured deflection versus movement in Z. As the separation between the probe and sample narrows in response to a drive signal or ramp, eventually the two will interact. In this case, an exemplary trigger force is set at 100 pN. If the deflection sensitivity and spring constant are known, so is the relationship between force and deflection. Deflection sensitivity is a voltage change sensed by the photo detector per unit distance of cantilever deflection. When the measured deflection corresponds to 100 pN, some action, typically set by the user prior to initiating the measurement, is taken (e.g., direction change, ramp speed increased, etc.). In this example, at the start of the ramp, at a zero baseline point 72, the tip and sample are far apart, and no deflection is measured. As the drive brings the tip and sample closer to one another, although the two do not interact, some deflection is measured. The random deflection data seen at region 74 of the curve is indicative of a deflection artifact(s), and as described previously, may be due to a variety of factors (e.g., AFM system imperfection, such as tilted motion or optical interference, etc.).

At point 76 of curve 70 (force $F_i$, Z position $Z_0$), actual interaction between the probe and sample begins. It is at this point in the ramp that the system should identify the "zero" deflection point. As noted above, in prior systems, this point cannot be reliably identified given the non-constant nature of the false deflection. As movement in "Z" continues to bring the probe and sample closer to one another, the measured deflection increases as the force between the two increases. This is the contact region identified as region 78. It is only at point 80 of curve, at a probe-sample separation (identified by location $Z_t$), that the desired trigger force, $F_t$, corresponding to a tip-sample interaction force equal to 100 pN, occurs.

However, the trigger force threshold, according to the data shown in FIG. 6, was met at an artifact Z position, $Z_a$, given that the measured deflection corresponding to the 100 pN trigger was achieved at that point. The false deflection causing the trigger condition to be erroneously met clearly compromises the experiment. It is one goal of the preferred embodiments to overcome this limitation and allow the instrument to accommodate these false deflections and correctly identify the desired trigger position, $Z_t$.

Figure 7:
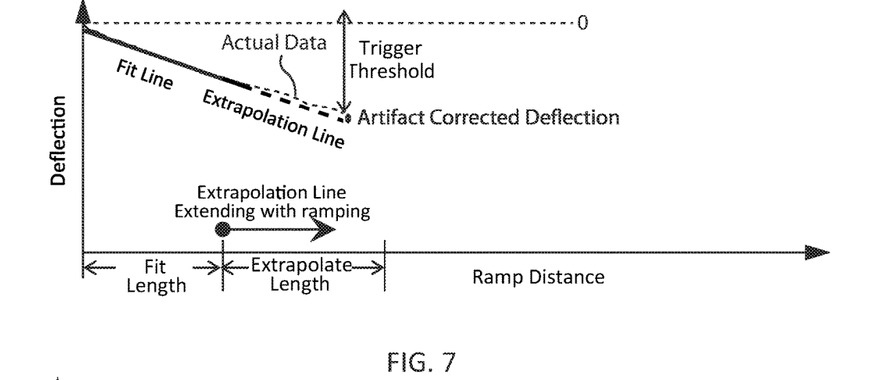
FIGS. 7-9 are a series of schematic plots of deflection versus ramp distance illustrating a method of a preferred embodiment of the present invention.
Figure 8:
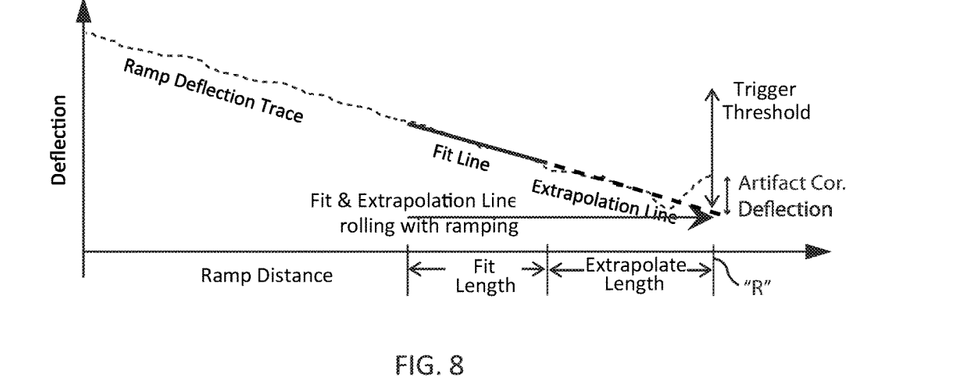
Figure 9:
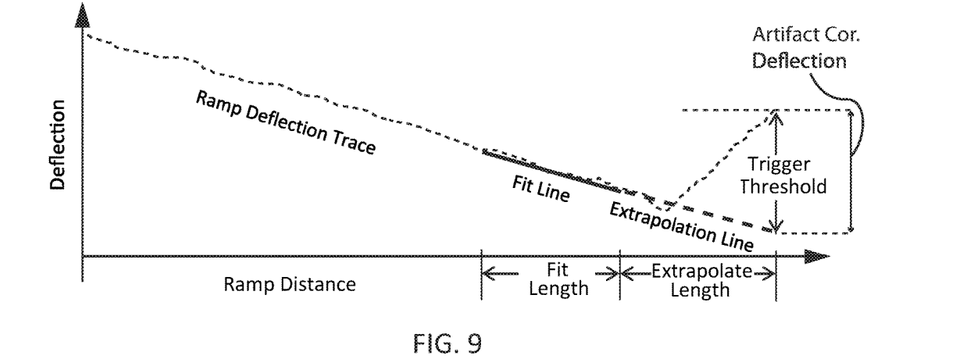

Turning to FIGS. 7-9, an illustration of a method for performing force measurements with an AFM by identifying trigger points indicative of actual probe-sample interaction force is shown. Most generally, the method employs an adaptive trigger by continually identifying an instantaneous baseline using a fraction of deflection data acquired upon initiation of the drive ramp and thereforward, the fraction of data is updated in essentially real-time. As the ramp drives the probe and sample in to (out of) contact, deflection artifacts due to conditions independent of actual probe-sample interaction are accommodated. Force measurements (and AFM control), in the sub-20 pN range are realized.

Initially, in FIG. 7, the ramp is begun and deflection is measured by the AFM when the probe and sample are a large distance apart from one another (0.5 um to 10 um). Such large separation can be predetermined by a known position of the z-stage, or with the aid of optical microscopy. As the ramp distance is increased, a "fit line" containing a small set of the targeted ramp data is determined using the deflection data for a particular "fit length." For example, if the targeted ramp size is 1 um with 1000 data points (1 nm per data point), the subset of the fitting data can be 100 data points, adjustable by the user, because the known distance to the sample is at least 500 nm, for example. The subset data contains 100 nm data where the tip is definitely out of short range interaction with the sample (short range interaction is usually defined as the tip-sample proximity less than 10 nm). This initial data set will produce an additional set of extrapolation data (120 data points with one data point per nm in this example) following the fitting in FIG. 7. The fitting and extrapolation can be either linear or non-linear. Any deflection detected at a ramp position past the fitting line should be subtracted by the extrapolation line. The net of the subtraction becomes the real deflection and is used to compare with the predefined trigger. In FIG. 7, the artifact corrected deflection is compared with the target trigger. Since it is well below the target the control system moves on to FIG. 8.

In FIG. 8, the set of fitting data is replaced by a new set of deflection measurement data because the trigger condition was not satisfied in the whole set of data in FIG. 7. The new set of fitting data again produce a fresh set of extrapolating points to subtract from the deflection measurement data. The difference, artifact removed deflection, is again compared with the predefined trigger. Again the corrected deflection is below the trigger threshold, and so the z-piezo continues to move the tip closer to the sample, relative to one another. This fit and extrapolation procedure is continued as the ramp continues, providing a rolling baseline (fit and extrapolation) once the ramp continues long enough to collect a sufficient amount of deflection data to do the fit, thus providing a true comparison baseline for the trigger threshold of the force experiment. In this case, deflection from actual probe sample interaction is sensed at ramp distance "R" (but as shown, the threshold trigger has not been met in this case).

Continuing to FIG. 9, the fit and extrapolation procedure continues to update the baseline and ensure that false deflection artifacts are accommodated, and the corresponding effects minimized, thereby maintaining the integrity of the comparison between the measured deflection (Deflection Trace) and the trigger threshold. As shown in FIG. 9, the extrapolation subtracted deflection (i.e., artifact corrected deflection) is equal to the preset trigger, satisfying the trigger condition, and the z-piezo will move the tip apart from the sample and start a retract measurement. In this way, trigger forces in the range of less than 20 pN, and even less than 10 pN can be utilized. Again, this is particularly advantageous for the contemplated experiments involving extremely delicate samples, and probe tips equipped with functionalized molecules (if tip-sample force is too severe, the functionalized molecule can be lost, for instance). Notably, a second, static threshold (as used in prior systems, include the one disclosed in the aforementioned Bruker '007 patent) may also be employed as a "safety trigger". While optional, it may be preferred to preserve the integrity of the system (probe, etc.).

The numerical numbers used in illustrating FIGS. 7-9 are only exemplary. The actual measurement range of z motion can vary from 100 nm to 200 um; the data point or subset of data can vary from 10 points to 10 million data points, limited only by the dynamic range of the modern digital processor. For example, for a 32-bit processor, the upper range of the data set is $4 \times 10^9$ data points.

Figure 10:
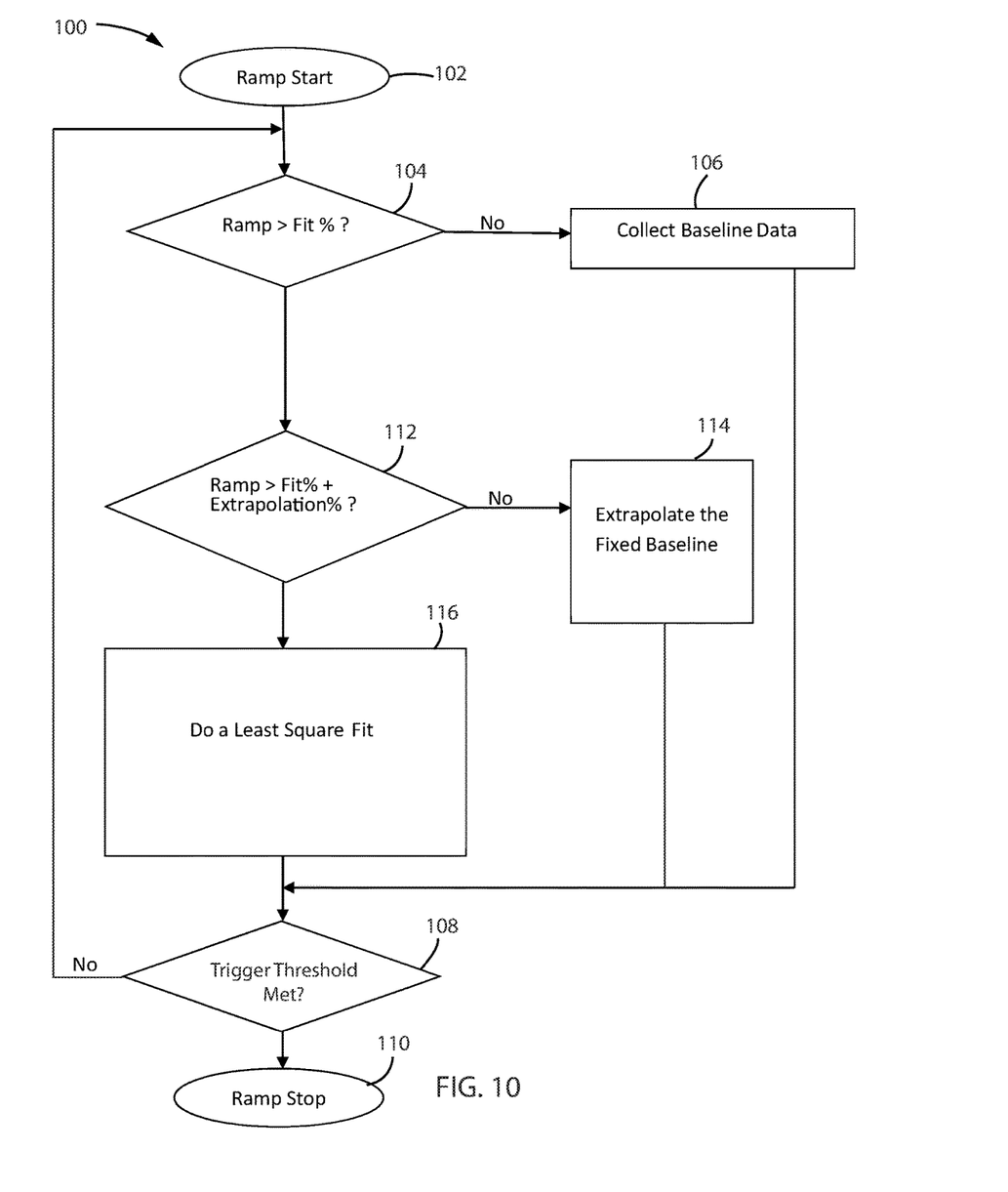
FIG. 10 is a flow chart illustrating a method of a preferred embodiment.

FIG. 10 shows a method 100 corresponding to the illustration of FIGS. 7-9. Initially, the ramp (in Z, causing the probe and sample to approach one another) is begun in Block 102 with the tip and sample out of contact with one another. Method 100 then determines, based on the measured deflection, whether the ramp is greater than a baseline fit corresponding to the measured deflection by a preset percentage in Block 104.

If not (i.e., the fit line substantially corresponds to the ramp), baseline data is collected in Block 106. With this check on the baseline (the amount of false deflection, if any, is acceptable), a comparison to determine whether a user-selected trigger threshold is met is performed in Block 108. If met, the ramp is stopped in Block 110, and a parameter of the force measurement may be changed according to the user's experiment. If the threshold is not met, control is returned to Block 104 to determine whether the ramp continues to corresponding to a fit line determined based on the measured deflection data, and the steps repeat.

On the other hand, if the ramp does not correspond to the fit line by the set percentage in Block 104 (e.g., the ramp is greater than the fit percentage), method 100 determines whether the ramp is greater than a combination of a percentage of the fit line and a percentage of an extrapolation line based on and extending from the fit line in Block 112. If not, method 100 extrapolates the fixed baseline to the current ramp position in Block 114, as shown in FIG. 7. A comparison to the threshold trigger can then be made in Block 108, as described previously. If on the other hand the ramp does not correspond to the fit line percentage and the extrapolation percentage, method 100 performs a least squares fit in Block 116, preferably adding the head data and removing the tail data in the extrapolation region. This operation allows method 100 to extrapolate the rolling baseline to the current ramp Z position prior to the comparison with the trigger threshold in Block 108.

Figure 11:
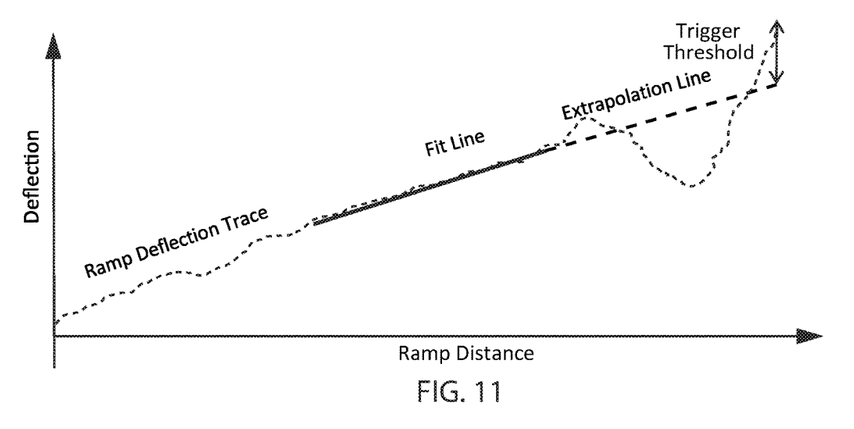
FIG. 11 is a schematic plot of deflection versus ramp distance illustrating triggering with a positive baseline slope.
Figure 12:
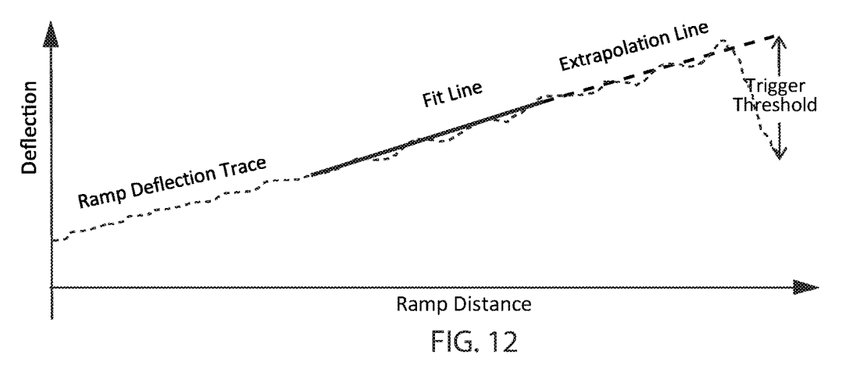
FIG. 12 is a schematic plot of deflection versus ramp distance illustrating triggering with a negative trigger threshold (adhesion)
Figure 13:
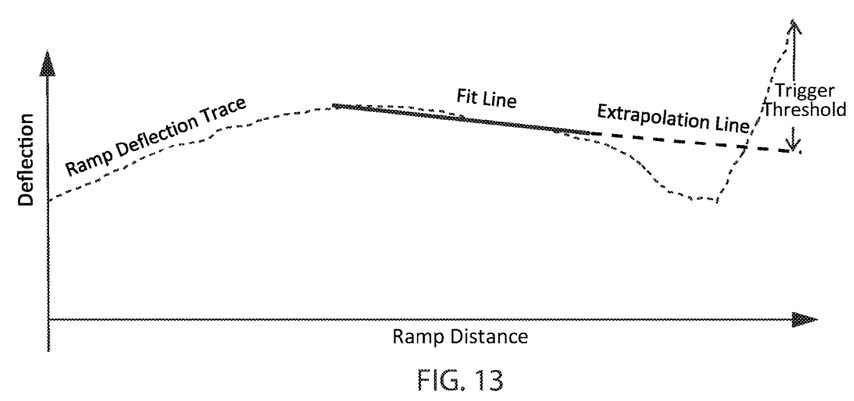
FIG. 13 is a schematic plot of deflection versus ramp distance illustrating triggering with a curved baseline and linear fit.
Figure 14:
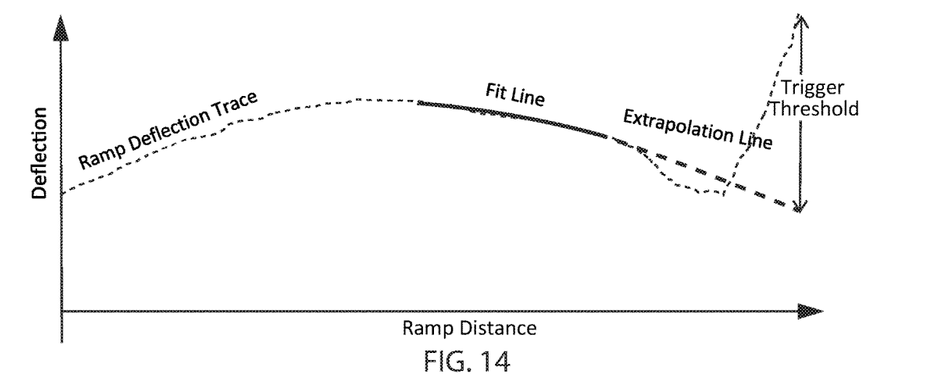
FIG. 14 is a schematic plot of deflection versus ramp distance illustrating triggering with a curved based line and a $2^{nd}$ order fit.

In sum, by employing a combination of conventional mathematical fits (linear, $2^{nd}$ order, etc.) and extrapolating the baseline, the preferred embodiments are able to, in essentially real-time, keep track of the true baseline, and thus discriminate false deflection artifacts. FIGS. 11-14 illustrate how the false deflection artifacts are corrected in different scenarios. FIG. 11 shows triggering with a positive baseline slope. FIG. 12 shows triggering with a negative baseline slope, such as during adhesion. FIG. 13 shows triggering when the baseline is curved. In this case, a linear fit is employed, forward or reverse trigger. In this regard, a number of alternatives may be employed within the context of the preferred embodiments including using different data types such as triggering on amplitude, and other types of ramps such as tip bias, sample bias, amplitude, frequency, etc.

Figure 15:
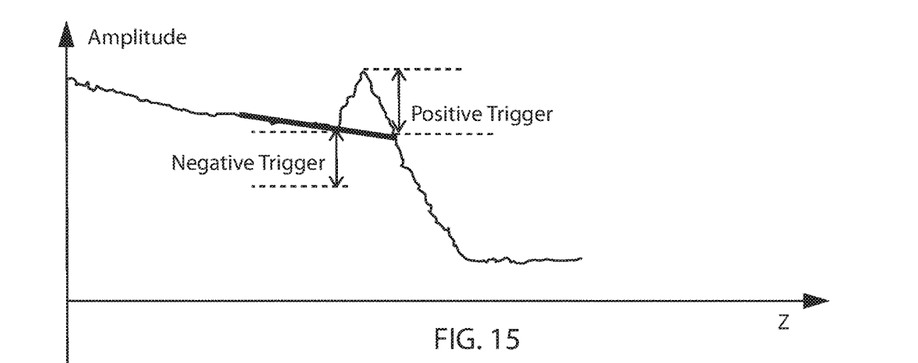
FIG. 15 is a schematic plot of amplitude versus ramp distance, illustrating triggering on alternate data types (amplitude)
Figure 16:
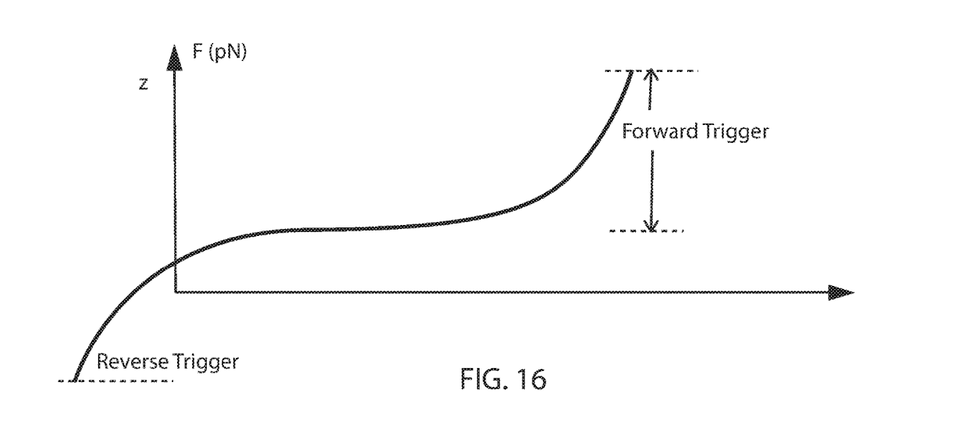
FIG. 16 is a schematic plot of force versus ramp distance, illustrating a double trigger (e.g., forward and reverse triggers)

By enabling precise determination of actual tip-sample interaction forces in the sub-20 pN range, a variety of force spectroscopy experiments are available using the preferred embodiments. For example, as shown in FIG. 15, a positive and a negative trigger may be employed (in this case triggering on amplitude data). In FIG. 16, a double trigger is employed which would be useful when measuring, for instance, a molecule. A forward trigger used to determine the maximum force between the probe and sample and a reverse trigger upon retracting the probe (or sample), for instance, with the molecule extending upon unfolding. More particularly in FIG. 16, the dashed curve is ramping toward the contact while the solid curve represents the AFM ramping away from tip-sample contact. Without continuously updating the baseline with the correction described herein, the measurement may be catastrophically compromised.

Figure 17:
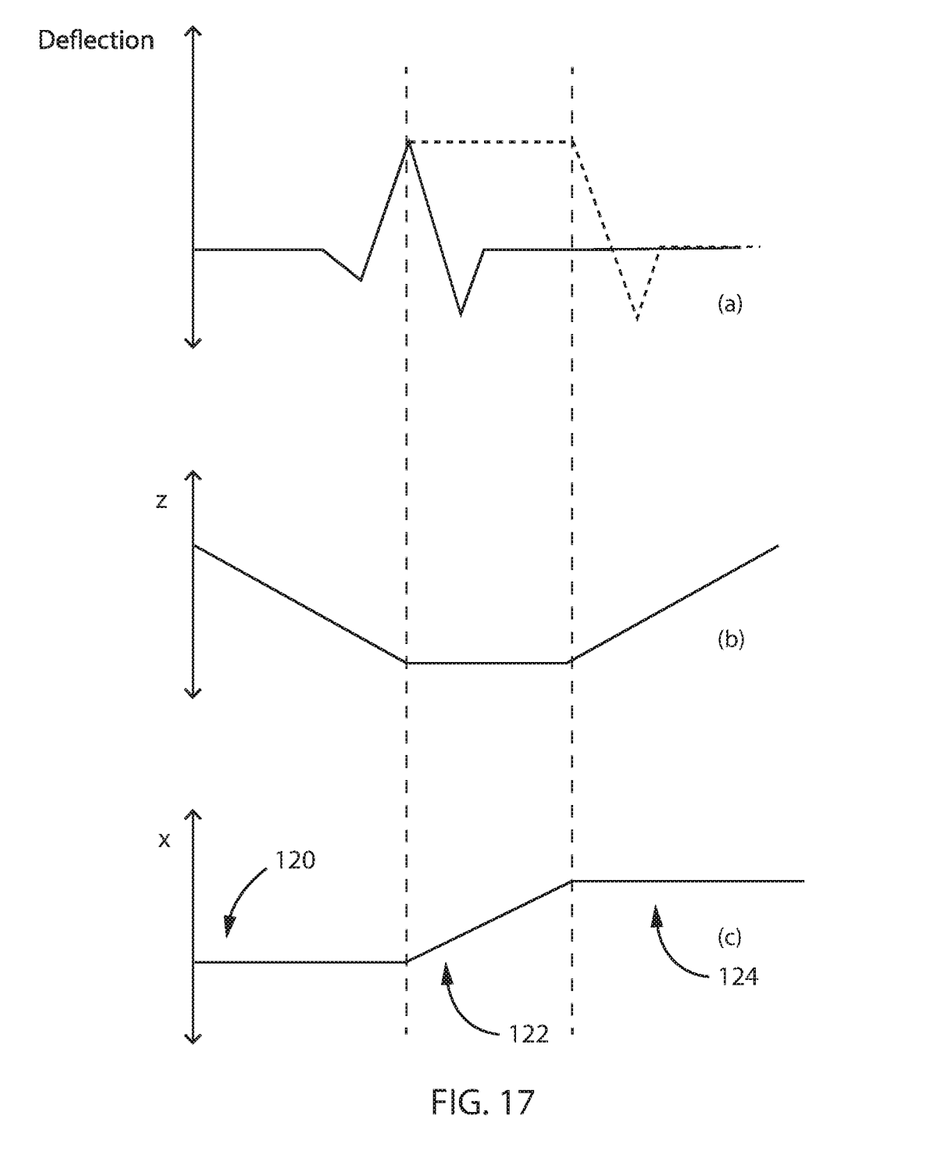
FIG. 17 is a set of schematic plots illustrating the use of the preferred embodiments to perform a scratch operation in response to a trigger.

In FIG. 17, a series of plots of deflection (FIG. 17A), the corresponding Z position (FIG. 17B) and relative lateral movement between the probe and sample (FIG. 17B, shown in "X" in this case) to perform a conventional "scratch" experiment upon the trigger condition being met (e.g., a certain tip sample interaction force suitable for the desired scratch). More specifically, unlike a conventional force curve (shown with the solid line of FIG. 17 (a)), in which the probe approaches the sample and is immediately retracted from it, the tip in this case approaches the sample and stays on the sample for some time before it is retracted from it (dotted line). The corresponding Z-position is shown in FIG. 17(b). As shown in FIG. 17(c), during the approach (region 120) and retract (region 124) periods, the probe does not move in the X direction. However, when the tip is on the sample with the controlled trigger force (region 122), the tip moves in the X direction, resulting in a "scratching" operation on the sample with a controlled trigger force. An example of AFM-based scratch nanolithography is discussed in *Nanopatterning on silicon surface using atomic force microscopy with diamond-like carbon (DLC)-coated Si Probe*, Nanoscale Res. Lett. 2011, 6(1):518.

Figure 19:
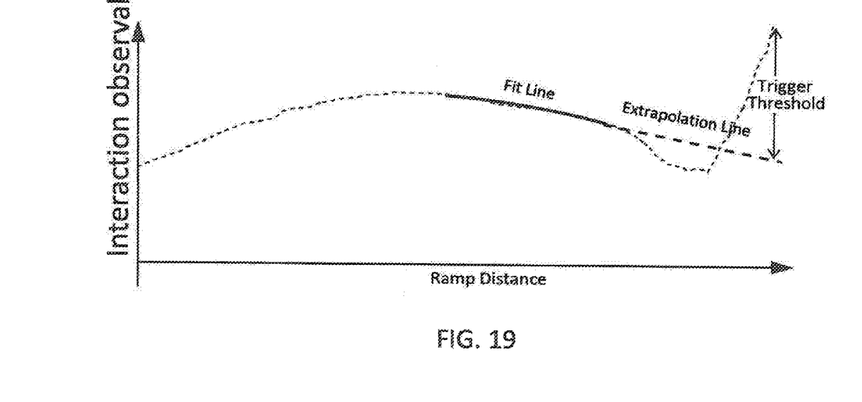
FIG. 19 is a schematic plot more generally showing that the preferred embodiments can be implemented more generally by monitoring "observable interaction" between the tip and sample, including, e.g., tip-sample interaction force.

It is notable that alternative embodiments to cover more general "interaction observables" related to tip-sample interaction (other than the above described force) are contemplated and shown in FIG. 19. For instance, the observable interaction may include at least one of a group including: force, deflection, electric interaction (e.g., force, current, voltage), magnetic interaction, thermal interaction and electromagnetic interaction, including scattering near field optical signals. Moreover, while the "ramp distance" has been described herein as the Z position, some other controllable parameter may be employed; for example, tip bias, sample bias, frequency, amplitude, etc.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. For example, while the curve fit and extrapolation methods described herein are preferred, alternative systems are contemplated in which, for example, a) spaced deflection points are averaged for comparison to an extrapolation, or b) the slope of different portions of the data curve are computed and a ratio of the slopes is computed for comparison to a preset trigger.

The invention claimed is:

1. An AFM having a probe that interacts with a sample, the AFM comprising:
    a scanner to position at least one of the probe and the sample at a location of interest of the sample;
    a Z-axis scanner to move at least one of the probe and the sample to lessen a separation therebetween and cause the two to interact;
    a detector to measure a deflection of the probe;
    a processor to discriminate a deflection artifact from a deflection due to probe-sample interaction from the measured deflection data by continuously identifying a baseline during the moving step to derive an artifact free deflection and compare it with a predefined trigger force;
    wherein the Z-axis scanner retracts the probe from the sample if the artifact free deflection substantially corresponds to the trigger force; and
    wherein the processor determines the force between the sample and the probe, wherein the force is less than 20 pN.

2. The AFM of claim 1, wherein the force is used as a trigger to change a parameter associated with the moving step.

3. The AFM of claim 2, wherein the parameter is at least one of a speed, a direction and a force gradient.

4. The AFM of claim 1, wherein the processor compares a drive ramp to a fit line based on data corresponding to the deflection, and further extrapolates the baseline based on the comparison.

5. The AFM of claim 4, wherein the fit line is determined by performing a least squares fit.

6. The AFM of claim 5, wherein the processor provides a rolling baseline until a threshold trigger is met.

7. An atomic force microscope (AFM) that detects a force between a sample and a probe of the AFM, the AFM comprising:
    an actuator that positions the at least one of the probe and the sample at a location of interest of the sample;
    a Z actuator that moves at least one of the probe and the sample to lessen a separation therebetween and cause the two to interact;
    a detector that measures a deflection of the probe in response to the probe-sample interaction; and
    a processor that uses the measured deflection, in real time as the Z actuator moves at least one of the probe and the sample, to determine an instantaneous baseline.

8. An atomic force microscope (AFM) including a probe that interacts with a sample, the AFM comprising:
    an actuator that positions at least one of the probe and the sample at a location of interest of the sample;
    a Z actuator that moves at least one of the probe and the sample to lessen a separation therebetween and cause the two to interact;
    a detector that measures an observable interaction between the probe and the sample based on the moving step;
    a processor that determines an observable interaction artifact from the observable interaction and derives an artifact free observable interaction, and wherein the processor compares the artifact free observable interaction with a trigger; and
    wherein the Z actuator retracts the probe from the sample if the artifact free observable interaction substantially corresponds to the trigger.

9. The AFM of claim 8, wherein the observable interaction includes at least one of a group including: force, deflection, electric interaction, magnetic interaction, thermal interaction and electromagnetic interaction.

10. The AFM of claim 9, wherein the observable interaction is an electric interaction, and the electric interaction is one of force, current and voltage.

11. The AFM of claim 9, wherein the electromagnetic interaction is based on scattered near field optical signals.

* * * * *